PHASE SHIFT SIGNALLING SYSTEM

Filed March 14, 1961

INVENTOR.
BOCK WOOD LEE
BY Lothrop & West
ATTORNEYS

Feb. 8, 1966 B. W. LEE 3,234,330

PHASE SHIFT SIGNALLING SYSTEM

Filed March 14, 1961 4 Sheets-Sheet 2

INVENTOR.
BOCK WOOD LEE
BY Lothrop & West
ATTORNEYS

Feb. 8, 1966 B. W. LEE 3,234,330

PHASE SHIFT SIGNALLING SYSTEM

Filed March 14, 1961 4 Sheets-Sheet 3

INVENTOR.
BOCK WOOD LEE

BY Lothrop & West

ATTORNEYS

PHASE SHIFT SIGNALLING SYSTEM

Filed March 14, 1961 4 Sheets-Sheet 4

INVENTOR.
BOCK WOOD LEE
BY Lothrop & West
ATTORNEYS

United States Patent Office 3,234,330

Patented Feb. 8, 1966

3,234,330

PHASE SHIFT SIGNALLING SYSTEM

Bock Wood Lee, Berkeley, Calif., assignor, by mesne assignments, to Noller Control Systems, Inc., Richmond, Calif., a corporation Filed Mar. 14, 1961, Ser. No. 95,741

8 Claims. (Cl. 178—67)

My invention relates to a means for transmitting intelligence in the form of signals from a sending station to a receiving station by means of electromagnetic energy.

Various means are well known for transmitting information and receiving it by electromagnetic means and these devices usually are modulated or varied, persuant to the intelligence to be transmitted, by amplitude variation or by frequency variation. While phase variation is also known, it has not been commercially used as much as other forms of modulation. One of the reasons is the difficulty of maintaining at the receiving station a standard or reference phase with which to compare the received signals and of coordinating this receiver reference phase with a standard or reference phase at the transmitting station. If this and other difficulties can be satisfactorily resolved, there are certain advantages to be attained by a phase shift system.

It is therefore an object of the invention to provide a commercially feasible signalling system which is modulated to cause a change or shift in the phase of the carrier. Such a system is advantageous in many installations; as an example, wherein controls are to be exercised over various instrumentalities such as in controlling operating machinery from a remote point or under automatic supervision from a distant station.

It is an object of my invention to provide an improved signalling system.

Another object of the invention is to provide a phase shift signalling system effective to transmit different signals over a signalling channel of a relatively narrow band width.

Another object of the invention is to provide a signalling system in which the transmission is not adversely affected by extraneous or spurious disturbances.

Another object of the invention is to provide a signalling system which does not require precise maintenance of frequency or of amplitude.

Another object of the invention is to provide a signalling system which lends itself to embodiment in a compact form, which consumes but relatively small amounts of power, which is quite dependable and reliable in its operation, which requires little if any maintenance and in which sturdy and stable elements are utilized.

Another object of the invention is to provide a signalling system employing a phase shift technique but which does not require the maintenance of a fixed reference phase at the sender or receiver.

Other objects together with the foregoing are attained in the embodiment of the invention described in the accompanying description and illustrated in the accompanying drawings in which.

In the form of embodiment of the invention chosen for explanatory disclosure herein, there is provided at the sending station (FIGURE 1) a source 6 of oscillatory electromagnetic energy in the form of a carrier having a designed frequency and amplitude. The carrier energy varies according to a sine curve with a selected amplitude and a selected frequency although neither the amplitude nor the frequency need be as closely controlled as is necessary in systems which do not rely upon a shift in phase of the carrier.

The source 6 is a standard form of oscillator well known and therefore not shown in detail but effective continuously to produce a sinusoidal or alternating carrier at an arbitrary, predetermined or standard phase. While the freqeuncy can drift or vary somewhat over a relatively long period of time and thus the phase can gradually shift slightly with the variation in frequency from one time as compared with a relatively remote preceding time, these minor drifts in frequency and minor phase changes are not of importance in the present system since means are provided for establishing a set amount of phase shift or change during any particular short time. Thus a standard or base phase at any one time does not necessarily reproduce the basic or standard phase at another, relatively remote time. It is primarily the instantaneous phase shift that is controlling. Hence, the oscillator or source 6 can be of any commercial sort effective to produce the desired carrier within the usual limitations of frequency, band width, stability and the like.

While, pursuant to the invention, the phase of the carrier emanating from the oscillator 6 can be shifted in various ways and in various amounts, it convenient to consider that the oscillating energy from the source 6 is repeatedly or successively shifted in certain discrete amounts, for example, one hundred eighty degrees or as another alternative plus ninety degrees or as a further alternative minus ninety degrees. Each of the degree shifts is measured from the instantaneous phase position of the carrier immediately prior to effectuation of that shift.

Figure 3:
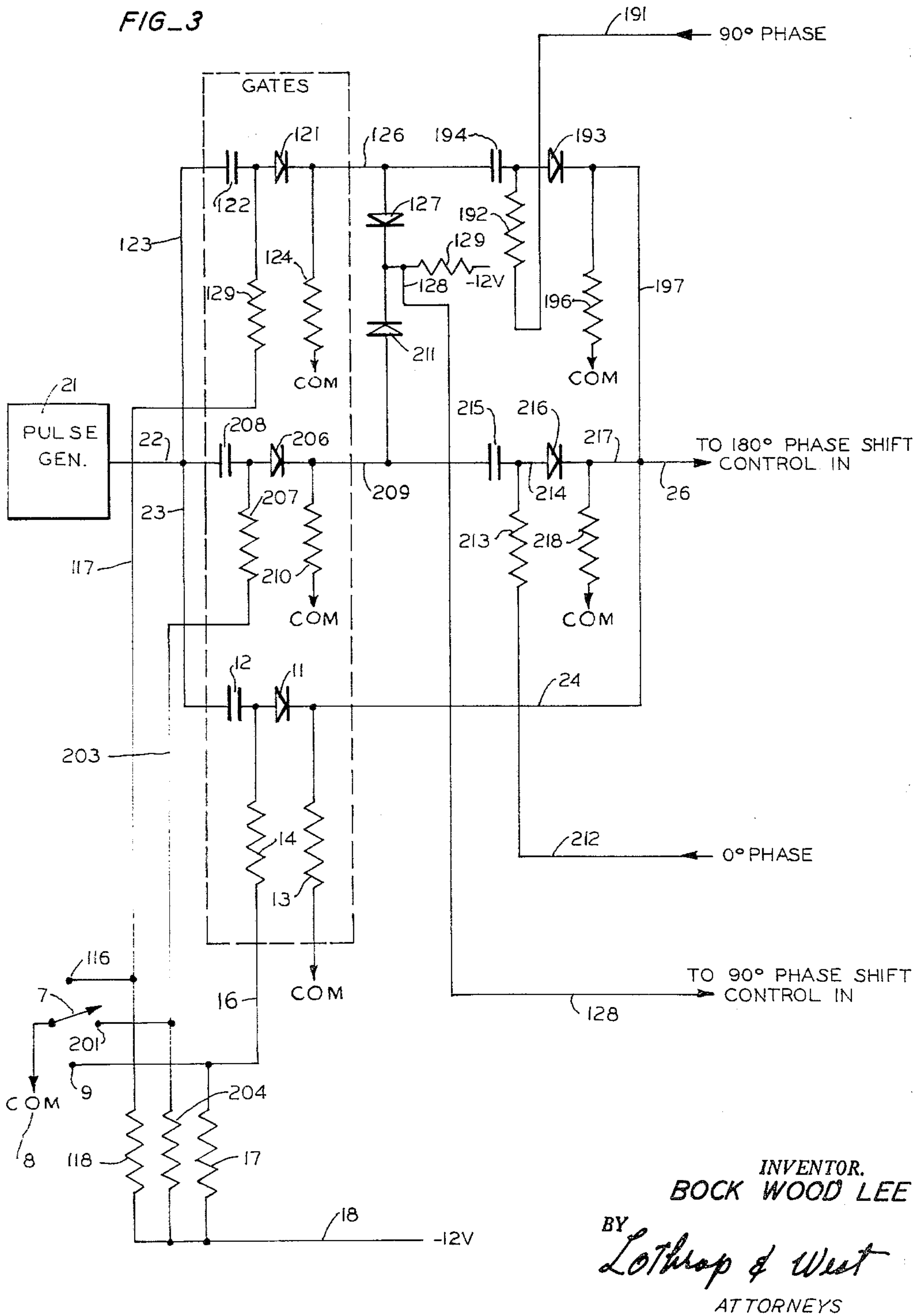
FIGURE 3 is a schematic diagram showing the arrangement of the input control mechanism.

As especially shown diagrammatically in FIGURE 3, there is afforded a control switch 7 manually operated and connected to a common connection 8. The switch 7 can occupy an "off" position as shown in the figure or can be swung to a lower point 9 which is the position for effectuating a one hundred eighty degree phase shift operation. When the switch 7 is in contact with the point 9, a one hundred eighty degree gate is opened by being connected to common. This first or one hundred eighty degree gate includes not only a diode 11 and a capacitor 12, but also a resistor 13 connected to common and a resistor 14. By means of a conductor 16 the resistor 14 is joined to the point 9, while the conductor 16 is branched through a resistor 17 to a conductor 18 leading to a source of negative potential, in the present case minus twelve volts.

The function of the first or one hundred eighty degree gate mechanism is to pass or to block the flow of pulses from a source 21 along a certain path. This pulse source 21 is of any standard kind and is effective to emit electrical pulses of predetermined duration at selected intervals. When the switch 7 is in contact with the point 9, the pulses from the generator 21 flow through a conductor 22 and a branch 23 and through the one hundred eighty degree gate, which is then conducting or open.

The pulses continue to flow through a conductor 24 and into a lead 26 which extends from the control unit 27 (FIGURES 1 and 3) to a mechanism 28 (FIGURE 4) which is a means for shifting the phase of the carrier from its nominal or zero position as it leaves the oscillator 6 to a new position one hundred eighty degrees from the zero position as measured immediately prior to the shift.

Figure 1:
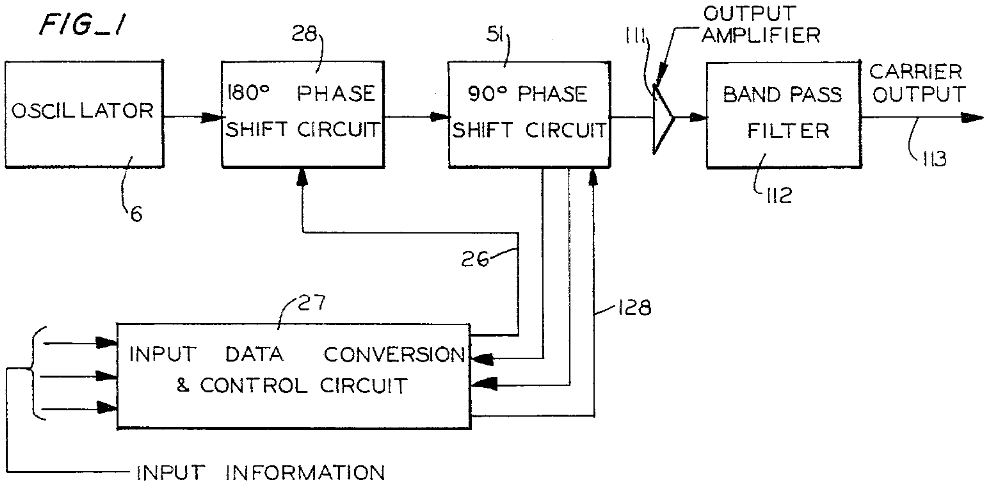
FIGURE 1 is a block diagram of the sending station component of the system.
Figure 4:
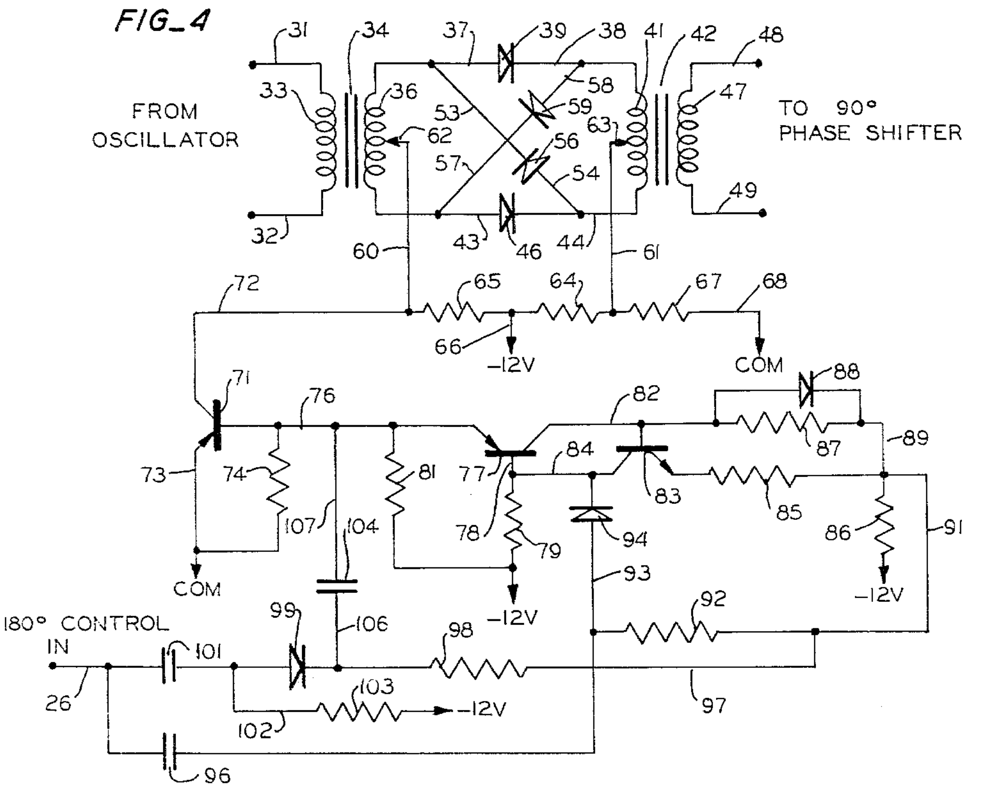
FIGURE 4 is a schematic diagram showing the arrangement of the first or one hundred eighty degree phase shift control means.
Figure 5:
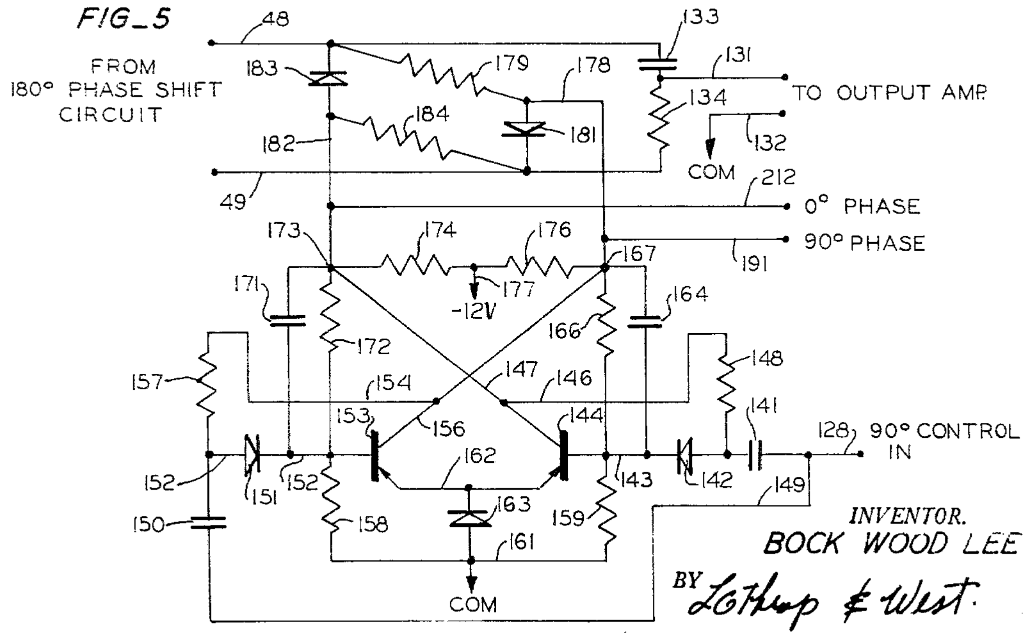
FIGURE 5 is a schematic diagram showing the second or ninety degree phase shift control means.

The one hundred eighty degree phase shift mechanism 28 is particularly disclosed in FIGURE 4 and includes leads 31 and 32 extending from the oscillator 6 and connected to the primary winding 33 of a first transformer 34. The secondary winding 36 of the first transformer is joined by conductors 37 and 38 through a diode 39 to the primary winding 41 of a second transformer 42. The secondary coil 36 is also connected to the primary coil 41 by conductors 43 and 44 including a similarly faced diode 46. The second transformer 42 has a secondary winding 47 provided with leads 48 and 49 which extend to a subsequent part of the mechanism, particularly a ninety degree phase shift unit generally designated 51 (FIGURES 1 and 5).

In the one hundred eighty degree phase shift mechanism 28 (FIGURE 4) are means for changing the relative operation of the transformers 34 and 42. This mechanism includes cross conductors 53 and 54 between the conductors 37 and 44 and including a diode 56 and cross conductors 57 and 58 between the conductors 43 and 38 and incorporating a diode 59. The diodes 56 and 59 face in the opposite way from the diodes 39 and 46. Conductors 60 and 61 extend respectively from center taps 62 and 63 on the secondary winding 36 of the first transformer 34 and the primary winding 41 of the second transformer 42, the conductors 60 and 61 being connected through resistors 64 and 65 to a lead 66 extending to the source of minus twelve volts. The conductor 61 also is connected through a resistor 67 to a lead 68 extending to the common conductor at zero volts. There is thus provided a voltage difference of minus twelve volts between the common lead 68 and the lead 66.

Means are provided for reversing the direction of voltage drop between the center taps 62 and 63 of the conductors 60 and 61. This reversing means is operated pursuant to and in accordance with the transmission of pulses thereto through the lead 26 (FIGURES 3 and 4) when the switch 7 is in connection with the point 9. The pulses from the pulse generator 21 on the lead 26 are effective to govern a transistor 71 the collector of which is connected by a lead 72 to a junction with the conductor 60 and the resistor 63 while the emitter of the transistor 71 extends through a lead 73 to the common connection. A resistor 74 shunts the emitter and is connected to a base lead 76 of the transistor 71.

A control pulse arriving when the transistor 71 is conducting will be effective to reverse this condition while if the transistor is not so conducting upon arrival of a control pulse it is made to conduct. The control pulse is directed toward the set or the reset leads of circuitry associated with the transistor 71 to change the existing condition thereof. That is, when the circuitry is in the set or "on" condition the collector of the transistor 71 is effectively connected to common. Current then flows from the center tap 62 to the center tap 63. When the associated circuitry is in the reset or "off" condition, the collector of the transistor 71 is effectively opened. Current then flows through the lead 68, the resistor 67 and the conductor 61 to the center tap 63 and then to the center tap 62, thus reversing the current flow and shifting the phase of the output on the leads 48 and 49 exactly one hundred eighty degrees.

The associated circuitry for this purpose includes the lead 76 which is extended to the emitter of a transistor 77. The base of the transistor 77 is connected by a conductor 78 to a source of minus twelve volts through a resistor 79. The resistor and the emitter of the transistor 77 are shunted by a resistor 81. The collector of the transistor 77 is joined by a lead 82 to the base of a transistor 83. A lead 84 connects the base of the transistor 77 to the collector of the transistor 83. The emitter of the transistor 83 is joined through a resistor 85 and a resistor 86 to the minus twelve volt supply.

The transistor 83 and the resistor 85 are shunted by a resistor 87 and a diode 88 arranged in parallel and being connected to the lead 82 and to a conductor 89 joined to one end of the resistor 86. A conductor 91 continues from that end of the resistor 86 through a resistor 92 to a lead 93. One end of the lead 93 is joined through a diode 94 to the lead 84 while the other end of the lead 93 extends through a capacitor 96 to a junction with the lead 26. The conductor 91 is provided with a branch 97 extending through a resistor 98 and a diode 99 to a capacitor 101 connected to the lead 26.

Connected to the branch 97 between the capacitor 101 and the diode 99 by means of a lead 102 is a resistor 103 extending to the source of minus twelve volts. A capacitor 104 is connected by a lead 106 to the branch 97 between the resistor 98 and the diode 99 and is also connected by a lead 107 to the base lead 76 between the two resistors 74 and 81.

When a pulse comes in through the lead 26, it is effective in the event the transistor 71 is not conducting to make the transistor 71 conducting and thus connect the lead 72 to common. Whenever a pulse comes in on the lead 26, it is effective to change the operating circumstances of the transistor 71 and so to reverse the direction of voltage drop between the two center taps 62 and 63 and to result in a one hundred eighty degree phase shift in the energy leaving on the leads 48 and 49.

When a succession of impulses is received through the lead 26 to the one hundred eighty degree phase shift mechanism 28 (FIGURE 4), the polarity on the transformers is repeatedly reversed and a succession of one hundred eighty degree phase shifts transpires. The rate of change of phase from standard or zero to one hundred eighty degrees and back again occurs at the same rate as that of the pulses.

When the switch 7 is moved from contact with the point 9, the first or one hundred eighty degree gate including the diode 11 is closed, no more pulses are transmitted through the conductor 24 and the voltage drop across the transformer midpoints remains in a fixed condition so that there is no shifting back and forth between a zero degree phase position and a one hundred eighty degree phase position.

Energy from the leads 48 and 49 can pass unchanged through the ninety degree phase shift mechanism 51 and through an amplifier 111 of standard sort, then through a band pass filter 112 of the customary kind and finally into the carrier output 113 for transmission.

The operator has another choice of phase shift. When the switch 7 is moved into contact with a point 116 (FIGURE 3), connection to the common connection 8 is then made to a conductor 117, one end of which passes through a resistor 118 to the conductor 18, whereas the other end of the conductor 117 leads through a resistor 119 into a plus ninety degree gate including a diode 121. On one side the diode 121 is connected through a capacitor 122 to a conductor 123 joined to the conductor 22. On the other side, the diode 119 is connected through a resistor 124 to common while the conductor 126 leads through a diode 127 to a conductor 128. A resistor 129 is connected to the conductor 128 and also to the source of minus twelve volts.

The conductor 128 leads from the control mechanism 27 (FIGURE 1) to the ninety degree phase shift arrangement, especially illustrated in FIGURE 5. The carrier on the leads 48 and 49 (FIGURE 5) is transmitted through the ninety degree phase shift mechanism to continue therefrom on conductors 131 and 132, the latter of which extends to the common connection. For shifting the phase in amount and direction on the way through the structure 51 there is included a capacitor 133 in series between the lead 48 and the conductor 131 and a resistor 134 in series between the lead 49 and the conductor 131. The relationship of the values of the resistor 134 and the capacitor 133 is such that the voltage across the resistor 134 to common is ninety degrees out of phase with the voltage appearing across the capacitor 133 when the capacitor is connected to common and thus as the common connection alternates between the resistor and the capacitor the phase relationship of these voltages shifts alternately between zero position and a plus ninety degree position.

To effectuate the repeated shifts between the zero and plus ninety degree positions, there is provided a reversing or flip-flop network preferably of the Eccles-Jordan type. The pulses from the pulse generator 21 which pass through the plus ninety degree gate including the diode 121 and which arrive on the conductor 128 (FIGURE 5) alternately take one of two substantially symmetrical paths. The conductor 128 extends through a capacitor 141 to a diode 142 connected by a conductor 143 to the base of a transistor 144. A conductor 146 joined to a lead 147 from the collector of the transistor 144 is joined through a resistor 148 to the conductor 128.

Similarly, a conductor 149 extends from the conductor 128 through a capacitor 150 and through a diode 151 in a conductor 152 joined to the base of a transistor 153. A conductor 154 is joined to a lead 156 extending from the collector of the transistor 153 and goes through a resistor 157 connected to the conductor 152. The bases of the transistors 153 and 144 are connected through resistors 158 and 159 respectively to a conductor 161 extending to the common connection. A diode 163 on one side is joined to the conductor 161 and on the other side to a conductor 162 connected to the emitters of the two transistors 153 and 144. From the conductor 143 a capacitor 164 and a resistor 166 are joined in parallel to a junction point 167 to which the lead 156 is also joined. The conductor 152 is joined in parallel through a capacitor 171 and a resistor 172 to a junction point 173 to which the lead 147 is likewise attached. Between the junction points 167 and 173 are disposed resistors 174 and 176 centrally connected to the source of minus twelve volts by a lead 177.

The junction point 167 is joined by a conductor 178 to a resistor 179 connected to the lead 48 and also is joined to a diode 181 which is connected to the lead 49. Symmetrically, the junction point 173 is joined by a conductor 182 to the lead 48 through a diode 183. A resistor 184 is at one end connected to the conductor 182 and at the other end is connected to the junction of the diode 181 and the lead 49.

In the operation of this mechanism, when there is no control impulse coming in on the conductor 128, the carrier on the leads 48 and 49 from the one hundred eighty degree phase shift mechanism travels to the conductor 131 and the conductor 132 without any shift in phase produced by the mechanism 51. However, when a pulse or a succession of pulses from the pulse generator 21 passes through the gate including the diode 119 and into the conductor 128, each pulse shifts the connection between the junction points 167 and 173 so that the carrier leaving on the conductors 131 and 132 has its phase shifted by each pulse an amount of ninety degrees with respect to its entering phase.

For one pulse coming in on the conductor 128 the phase is not only shifted ninety degrees, but is shifted ninety degrees in an arbitrarily forward direction or from zero degrees position to plus ninety degrees position. For the next pulse coming in on the conductor 128, the phase is shifted again ninety degrees but in an arbitrarily reverse direction; that is, from plus ninety degree position to zero degree position. Consequently, as a succession of pulses arrives on the conductor 128 the ninety degree phase shift mechanism causes phase shifts first forwardly ninety degrees and then backwardly ninety degrees. Stated differently, when considered alone the effect of the ninety degree phase shift mechanism is to make a positive phase shift of ninety degrees for one impulse and then to make a ninety degree phase shift in the reverse direction back to original phase condition for the second impulse.

Under some circumstances the alternate shift of ninety degrees in phase forwardly and backwardly can be directly utilized, but it is in most cases preferred to have all of the ninety degree phase shifts ultimately occur successively in a forward or plus direction or ultimately to occur successively in a reverse or minus direction. Consequently, the point 116 is considered to control only a plus or positive ninety degree phase shift.

In order to produce this desired result despite the reversing of the successive ninety degree phase shifts resulting from the FIGURE 5 mechanism alone, there is provided additional mechanism for selectively combining the effect of the ninety degree phase shift structure with the effect of the one hundred eighty degree phase shift arrangement. A phase shift from zero position to plus ninety degree position can be considered as tantamount to a shift from zero position to minus ninety degree (two hundred seventy degree) position provided that the shift to plus ninety degree position has added to it a shift of one hundred eighty degrees. Whether the one hundred eighty degree shift is plus or minus or positive or negative is immaterial.

Just as adding one hundred eighty degrees to the plus ninety degree position results in a minus ninety degree position, the addition of one hundred eighty degrees to the zero degree position results in a one hundred eighty degree position. Therefore, an arrangement is provided so that when on one impulse the ninety degree phase shift occurs positively from zero degrees position to plus ninety degrees position it is not added to nor disturbed, but on the next impulse when the shift is from plus ninety degrees position negatively back to zero degrees poistion, then one hundred eighty degrees of phase shift is added. The ultimate, next position then indicates a positive ninety degree shift. The succeeding shift is from zero degree position to plus ninety degree position. This is again positive so that nothing is added. On the subsequent pulse when the shift is from plus ninety degrees position back to zero, there is again added one hundred eighty degrees, making again an apparent or indicated positive shift of ninety degrees. Thus the progression of ninety degree phase shifts can always be made to occur in a positive direction provided that the plus ninety degree condition of the ninety degree phase shifter is sensed each time it occurs.

For that reason, as shown in FIGURE 5, a sensing conductor 191 extends from the conductor 178 which responds when the ninety degree phase shift mechanism is in its plus ninety degree position. The conductor 191 (FIGURE 3) extends through a resistor 192 included in a gate incorporating a diode 193 connected through a capacitor 194 to the conductor 126. A resistor 196 extends to ground from a conductor 197 joined to the diode 193 and to the lead 26.

When the conductor 191 responds to the plus ninety degree position of the ninety degree phase shift mechanism, the gate including the diode 193 is opened so that the same pulse from the pulse generator 21 which flows through the conductor 123 and the gate including the diode 121 is divided, a portion of it flowing through the diode 127 into the conductor 128 as previously described, and another portion of it flowing through the open gate including the diode 193 and the conductor 197 to the lead 26. Thence the diverted portion of the pulse flows into the one hundred eighty degree phase shift mechanism (FIGURE 4). When the ninety degree phase shifter is in its plus ninety degrees position, the same pulse simultaneously produces two phase shifts, a negative phase shift of ninety degrees in the ninety degree shift mechanism (FIGURE 5) and a one hundred eighty degree phase shift in the one hundred eighty degree shift mechanism (FIGURE 4). The net result is that there then appears at the output of the mechanism 51 an apparent or net plus ninety degree phase shift. Under these circumstances, the amplifier 111 and the filter 112 put a plus ninety degree phase shift on the output 113. Since the conductor 191 (FIGURE 5) is not effective when the ninety degree phase shift mechanism is in zero degrees position, there results from this arrangement a feeding of a succession of ninety degree positive phase shifts into the amplifier 111 as long as the switch 7 is in the plus ninety degree position to furnish pulses.

Comparably, a series of negative ninety degree shifts can be effectuated with continuing successive pulses. This is accomplished by moving the switch 7 into abutment with a point 201, a minus ninety degree phase shift position, having a lead 202 joined to a conductor 203. A resistor 204 is between the conductor 203 and the conductor 18. The conductor 203 controls a gate including a diode 206 connected to the conductor 203 through a resistor 207 and connected to the conductor 22 through a capacitor 208. The diode 206 is joined to a conductor 209 having a resistor 210 connected to common. The conductor 209 is joined through a diode 211 to the conductor 128 extending to the ninety degree phase shift control.

There is a conductor 212 joined to the conductor 182 which is active when the ninety degree phase shift mechanism is in zero degrees position. The conductor 212 is connected through a resistor 213 to a conductor 214. This latter is joined through a capacitor 215 to the conductor 209 and is also joined through a diode 216 to a lead 217 extending to the lead 26. A resistor 218 joins the lead 217 to common. The lead 26 extends to the one hundred eighty degree phase shift mechanism as shown in FIGURES 1 and 4.

In the operation of this device, whenever the ninety degree phase shift mechanism is in its zero degrees condition and the conductor 182 is active, the gate including the diode 216 is open, and then pulses from the pulse generator 21 travel not only through the conductor 22 and the conductor 209 into the conductor 128 to actuate the ninety degree phase shift control mechanism, but divide and also travel through the conductor 214 and the diode 216 into the lead 217 and the lead 26 to activate the one hundred eighty degree phase shift control. Under these circumstances, wherenever there is a shift from zero degrees position toward the plus ninety degrees position, there is added a one hundred eighty degree shift. This in effect makes the shift to the minus ninety degree position (two hundred seventy degree position). This, then, is a ninety degree shift in a negative direction.

The next shift of the ninety degree mechanism due to the next pulse is automatically in the negative direction, being from the plus ninety degree position back to zero degrees position. The one hundred eighty degree shift mechanism is not then activated. Thus, there are ninety degree shifts made successively in the negative direction, one being without the help of the one hundred eighty degree phase shift mechanism and in the next being with the addition of the one hundred eighty degree phase shift. When the switch 7 is on the point 201, there is transmitted through the amplifier 111 and the filter 112 to the output 113 a succession of ninety degree phase shifts in the negative direction, each phase shift being in time with a pulse emanating from the pulse generator 21.

With the sending mechanism as so far described, the operator by properly positioning the switch 7 can transmit alternating electromagnetic energy in a succession of one hundred eighty degree phase shifts or can produce a succession of plus ninety degree phase shifts or can produce a succession of minus ninety degree phase shifts. The energy so emanated and so distinguished in accordance with the signals impressed upon it by the switch 7 is transmitted within one tone band on the carrier circuit for reception.

Figure 2:
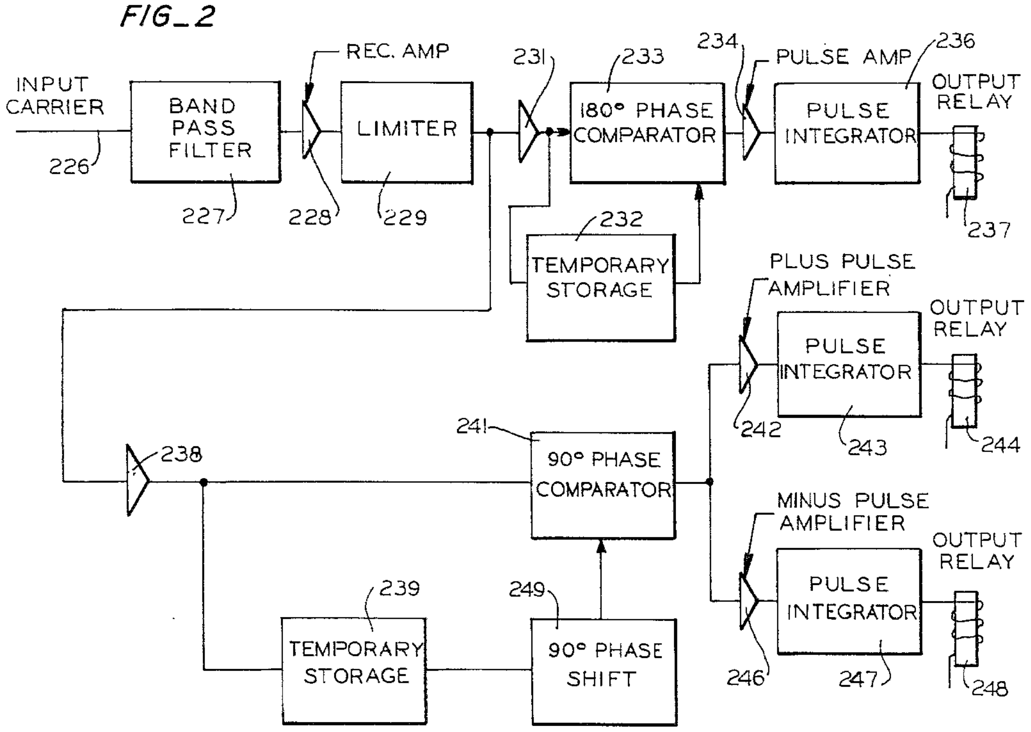
FIGURE 2 is a block diagram of the receiving station component of the system.

At the receiver, particularly as shown in FIGURE 2, the energy received in any one of the three described forms of phase shift is impressed upon the input 226 and goes through a standard band pass filter 227 in the usual way and also through a receiving amplifier 228 of a standard kind and through a customary kind of limiter 229. The received energy then divides and part is passed through another amplifier 231 into a temporary storage unit 232 and a phase comparator 233. The function performed is to compare the phase of the momentarily received signal with the phase of a retained previous signal acting as a standard or datum. If the phase comparator detects a one hundred eighty degree phase shift, then the comparator 233 emanates a pulse and the storage unit realigns itself with the phase of the just received signal which will then serve as a standard for the next signal received. This goes through a pulse amplifier 234 and into a pulse integrator 236. So long as a succession of pulses is received in the integrator 236 due to the continued reception of signals each shifting one hundred eighty degrees with respect to the immediately preceding signal, then the pulse integrator 236 maintains an output relay 237, or comparable control device, in one condition. The relay 237 reverts to its other condition when no signal is received from the integrator 236, which is inactive whenever the one hundred eighty degree phase comparator 233 finds no successively received signals shifting phase one hundred eighty degrees.

In a comparable fashion, the other portion of the divided signal from the limiter 229 flows through an amplifier 238 and into a temporary storage mechanism 239 and into a ninety degree phase comparator 241. This arrangement is effective to sense a ninety degree phase shift between a signal just being received and all or a part of a preceding signal which has been briefly stored in the temporary storage network 239. If there is a plus ninety degree phase shift detected in the comparator 241, then a positive pulse issues from the comparator 241 and that positive pulse passes through an amplifier 242 into a pulse integrator 243 to condition an output relay 244 or other similar instrumentality.

If a plus ninety degree pulse shift is not detected between the signal in the comparator 241 and that retained in the storage 239, then no energy goes through the amplifier 242 and the relay 244 is permitted to revert to its other condition.

If the ninety degree phase comparator 241 detects a phase shift in a negative direction, then a negative pulse emanates from the comparator 241, passes through an amplifier 246 and thence through a pulse integrator 247. This actuates a relay 248 or other controlled instrumentality. For various reasons, it is preferred to include with the ninety degree phase comparator 241 a set ninety degree phase shift mechanism 249. The comparators 233 and 241 can then be virtually identical in construction and so that in effect a ninety degree phase shift has a further ninety degree phase shift added to it and can be handled as a one hundred eighty degree phase shift.

Figure 6:
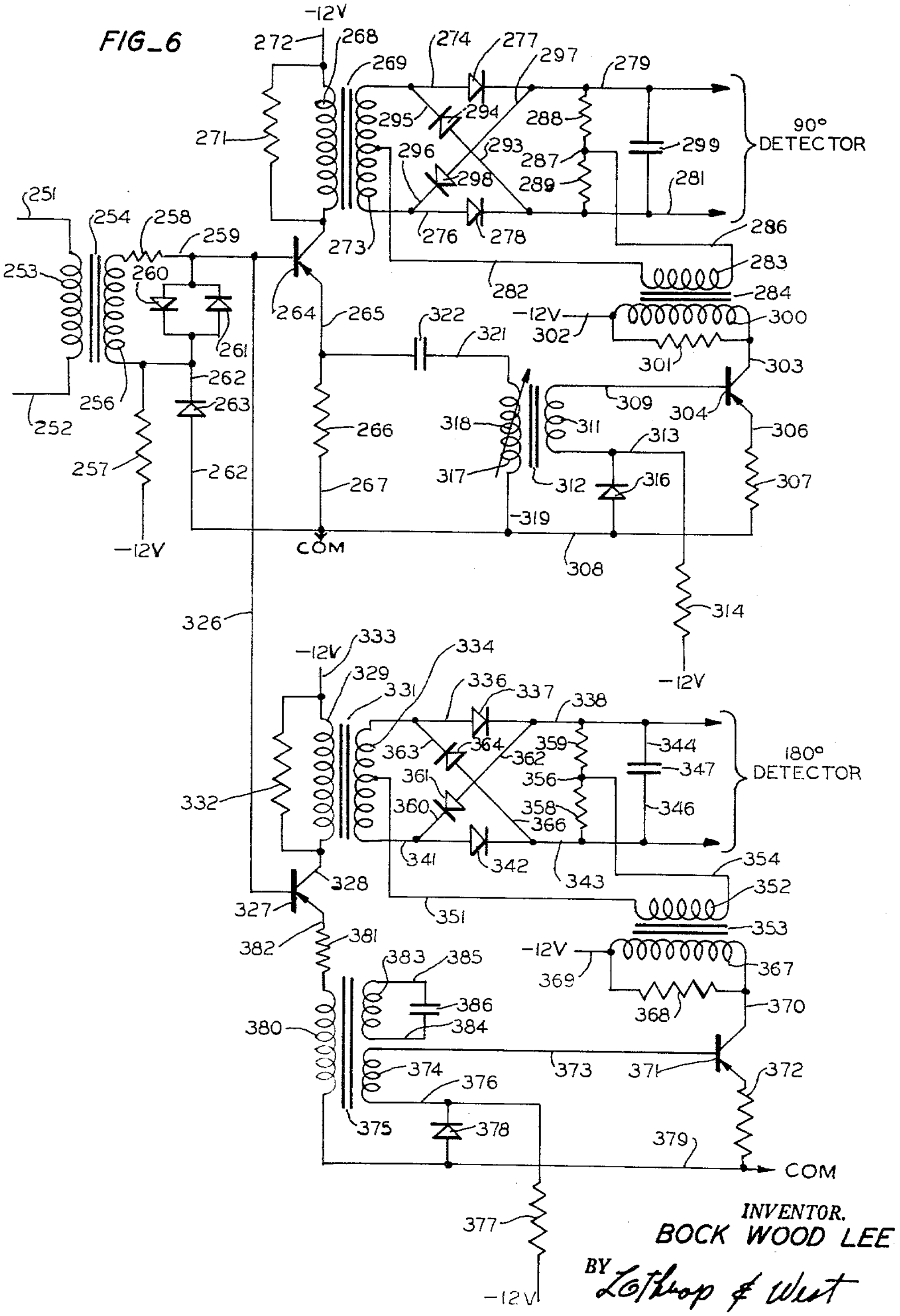
FIGURE 6 is a schematic diagram showing the principal parts of the receiving station equipment.

The circuitry utilized in the receiver is particularly shown in FIGURE 6. The carrier input is received on conductors 251 and 252 connected to the primary winding 253 of a transformer 254. The secondary winding 256 of the transformer 254 at one end is connected through a resistor 257 to a source of minus twelve volts and at the other end through another resistor 258 to a conductor 259. Shunting the secondary coil 256 are parallel, oppositely facing diodes 260 and 261 connected by a lead 262 from the transformer secondary through a diode 263 to comon and included in a limiter for the incoming signals. The conductor 259 extends to the base of a transistor 264, the emitter of which is connected by a conductor 265 through a resistor 266 and a conductor 267 to common.

The collector of the transistor 264 is connected to one end of the primary coil 268 of a transformer 269 and is also connected through a parallel resistor 271 to a conductor 272 joined to the other end of the primary coil 268 and extending to the source of minus twelve volts. The secondary coil 273 of the transformer 269 is joined to conductors 274 and 276. These connect to diodes 277 and 278 joined to conductors 279 and 281 extending to the ninety degree phase shift responsive mechanism. The secondary coil 273 is center tapped and is joined by a conductor 282 to the primary coil 283 of a transformer 284, the coil 283 being joined by a lead 286 to a center tap 287 between a pair of resistors 288 and 289 respectively connected to the conductors 279 and 281. Conductors 293 and 295 cross connect a diode 294 to the conductors 274 and 281, where as conductors 296 and 297 cross connect a diode 298 to the conductors 276 and 279. The diodes 294 and 298 face oppositely to the diodes 277 and 278. A capacitor 299 bridges the conductors 279 and 281.

The transformer 284 has a winding 300 shunted by a resistor 301 and is at one end connected by a lead 302 to the source of minus twelve volts and at the other end is connected by a lead 303 to the collector of a transistor 304. The emitter of the transistor 304 is connected by a conductor 306 through a resistor 307 and a conductor 308 to common. The base of the transistor 304 is connected by a lead 309 to one winding 311 of a transformer 312 also joined by a conductor 313 through a resistor 314 to the source of minus twelve volts. A diode 316 is connected between the conductor 313 and the common conductor 308. The other winding 317 of the transformer 312 has a variable inductance represented by the arrow 318, is connected at one end by a lead 319 to the conductor 308 and at the other end is joined by a lead 321 through a capacitor 322 to the conductor 265 between the transistor 264 and the resistor 266.

The signals on the conductor 259 have a divided path and not only go to the base of the transistor 264, but also travel through a conductor 326 extending to the base of a transistor 327. The collector of the transistor 327 is joined by a lead 328 to one end of a winding 329 of a transformer 331. The winding 329 is shunted by a resistor 332 connected by a lead 333 which connects both the resistor and the other end of the winding to the source of minus twelve volts. The other winding of the transformer 331 is a coil 334 at one end connected by a conductor 336 to a diode 337 also connected to a conductor 338. The other end of the coil 334 is joined by a conductor 341 through a diode 342 to a conductor 343. The two conductors 338 and 343 are bridged by leads 344 and 346 to a capacitor 347.

The winding 334 is provided with a center tap joined by a conductor 351 to a winding 352 of a transformer 353. A lead 354 from the winding 352 goes to a center tap 356 between a pair of resistors 358 and 359 respectively connected to the conductors 338 and 343. A cross lead 360 connects the conductor 341 to a diode 361 cross connected to the conductor 338 by a lead 362. Similarly, a cross lead 363 is joined to a diode 364 which is cross connected by a lead 366 to the conductor 343. The diodes 337 and 342 face oppositely to the diodes 361 and 364.

The transformer 353 has another winding 367 shunted by a resistor 368. One end of the winding 367 and of the resistor 368 is connected by a lead 369 to the source of minus twelve volts, whereas the other end is joined by a lead 370 to the collector of a transistor 371. The emitter of the transistor 371 is joined through a resistor 372 to common. The base of the transistor 371 is joined by a conductor 373 to one end of a winding 374 forming part of a transformer 375. The other end of the winding 374 is connected by a conductor 376 through a resistor 377 to the source of minus twelve volts. A diode 378 is joined to the conductor 376 and to a common conductor 379. This latter also extends through another winding 380 of the transformer 375. A resistor 381 is interposed in a lead 382 extending from the winding 380 of the transformer to the emitter of the transistor 327. Also included in the transformer 375 is a supplementary winding 383 in circuit by means of leads 384 and 385 with a capacitor 386 to effectuate pulse storage.

The operation of the network in the lower portion of FIGURE 6 is to determine whether a signal received through the conductor 326 is one hundred eighty degrees out of phase with the briefly stored portion of the immediately preceding signal. If a one hundred eighty degree phase difference is not detected, then no pulse emanates from the conductors 338 and 343 to the pulse amplifier 234 but if a one hundred eighty degree phase difference between the signal and the stored portion of the immediately preceding signal is detected, then a new pulse emanates from the conductors 338 and 343 into the pulse amplifier 234 and through the pulse integrator 236 into the output relay 237 as previously described. In a quite similar fashion, the network at the upper portion of FIGURE 6 causes new pulses to emanate into the pulse integrator 243 in the event the ninety degree phase shifts are positive and into the pulse integrator 247 in the event the detected ninety degree phase shifts are negative.

With the networks as described, signals received at the receiver having either a one hundred eighty degree phase shift or having a plus ninety degree phase shift or alternatively having a minus ninety degree phase shift are detected, are compared to briefly stored preceding signals as temporary standards, are sorted and are sent to their respective responsive devices such as 237, 244 and 248. So long as a signal of one kind of shift, such as one hundred eighty degrees, arrives, the output relay 237 is kept individually activated. When such signal fails to arrive, the relay 237 is not activated. Similarly, so long as a signal is received involving a shift of plus ninety degrees in phase, then that signal is effective to maintain the output relay 244 uniquely activated. As soon as such signal stops, then the relay 244 reverts to its other condition. Finally, whenever a signal involving minus ninety degree phase shifts is received, then this puts just the output relay 248 in its activated condition and when the minus ninety degree phase shift signal ceases, then the relay 248 reverts to its previous condition. While the description herein has used phase shifts of one hundred eighty degrees and of ninety degrees as illustrative examples, it is feasible to use phase shifts of any other convenient number of degrees or amounts. Also while a train or series of phase shifts of one amount may be used, it is also feasible to employ phase shifts of different amounts interspersed or in effect time multiplexed.

Pursuant to this invention there are transmitted over a relatively narrow band width without critical regard to amplitude and frequency thereof at least three different types of signals which are characterized by different phase shifts and which are received and appropriately sorted and respectively condition individually controlled instrumentalities.

What is claimed is:

1. A phase shift signalling system comprising a sender including the following: means for generating a succession of electric pulses; first means for conducting said succession of pulses and for establishing the phase of each of said pulses one hundred eighty degrees from the phase of the immediately preceding pulse in said succession; second means for conducting said succession of pulses and for establishing the phase of each of said pulses ninety degrees from the phase of the immediately preceding pulse in said succession; third means for conducting said succession of pulses and for establishing the phase of each of said pulses two hundred seventy degrees from the phase of the immediately preceding pulse in said succession; means for selectively coupling said pulse generating means with any one of said conducting means; and means for transmitting a succession of said pulses from any one of said conducting means; and said system comprising a receiver including the following: means for receiving said succession of pulses; fourth means for determining and responding solely to a one hundred eighty degree phase difference between each one of said pulses and the immediately preceding pulse; fifth means for determining and responding solely to a ninety degree phase difference between each one of said pulses and the immediately preceding pulse; sixth means for determining and responding solely to a two hundred seventy degree phase difference between each one of said pulses and the immediately preceding pulse; and a plurality of actuating means each respectively responsive to one of said fourth, fifth and sixth means.

2. A phase shift signalling system comprising a sender including the following: means for generating a succession of electric pulses; first means for conducting said succession of pulses and for establishing the phase of each of said pulses one hundred eighty degrees from the phase of the immediately preceding pulse in said succession; second means for conducting said succession of pulses and for establishing the phase of each of said pulses ninety degrees alternately forwardly and backwardly from the phase of the immediately preceding pulse in said succession; third means for combining pulse outputs from said second means with pulse outputs from said first means; means for connecting said generating means selectively with said first or said second conducting means; and means for transmitting a succession of said pulses from said first or said second conducting means; and said phase shift signalling system also comprising a receiver including the following: means for receiving a succession pulses; fourth means for determining and responding solely to a one hundred eighty degree phase difference between each one of said pulses and the immediately preceding pulse in said succession of pulses; fifth means for determining and responding solely to a ninety degree phase difference between each one of said pulses and the immediately preceding pulse in said succession of pulses; sixth means for determining and responding solely to a two hundred seventy degree phase difference between each one of said pulses and the immediately preceding pulse in said succession of pulses; and a plurality of actuating means each respectively responsive to one of said fourth, fifth and sixth means.

3. A phase shift signalling system as in claim 1 in which the phase differences are predetermined values other than ninety, one hundred eighty and two hundred seventy degrees.

4. A phase shift signalling system comprising means including an oscillator for furnishing an alternating carrier, means for generating a first succession of pulses each differing from the immediately preceding pulse by one hundred eighty degrees in phase, means for generating a second succession of pulses each differing from the immediately preceding pulse by ninety degrees, alternate pulses of said second succession of pulses being in the positive direction and intervening pulses of said second succession of pulses being in the negative direction, means for sensing said intervening pulses, means controlled by said intervening pulse sensing means for joining said intervening pulses with pulses from said first succession to produce combined pulses each differing from the preceding pulse by ninety degrees in the positive direction, means for sensing said alternate pulses, means controlled by said alternate pulse sensing means for joining said alternate pulses with pulses from said first succession to provide combined pulses each differing from the preceding pulse by ninety degrees in the negative direction, switch means for selectively impressing said first succession of pulses on said carrier or for impressing said alternate pulses interspersed with said combined positive direction pulses on said carrier or for impressing said intervening pulses interspersed with said combined negative direction pulses on said carrier and also comprising means for comparing each of said successive pulses received on said carrier solely with an immediately preceding received pulse, means responsive to a one hundred eighty degree phase difference between said compared pulses for actuating a first device, means responsive to a ninety degree phase difference in a positive direction between said compared pulses for actuating a second device, and means responsive to a ninety degree phase difference in a negative direction between said compared pulses for actuating a third device.

5. A phase shift signalling system comprising means including an oscillator for furnishing an alternating carrier, means for generating a first succession of pulses each differing from the immediately preceding pulse by one hundred eighty degrees, means for generating a second succession of pulses each shifted from the immediately preceding pulse alternately by ninety degrees forwardly and then by ninety degrees backwardly, and means for simultaneously impressing on said carrier combined pulses made by joining pulses from said first succession with selected ones of said shifted pulses from said second succession.

6. A phase shift signalling system as in claim 5 in which said selected pulses from said second succession are forwardly shifted pulses only.

7. A phase shift signalling system as in claim 5 in which said selected pulses from said second succession are rearwardly shifted pulses only.

8. A phase shift signalling system comprising an alternating carrier, a source of successive pulses, means for impressing on said carrier a succession of first pulses from said source, the phase of one of said first pulses being random and the phase of each successive first pulse being one hundred eighty degrees from its preceding pulse, means for impressing on said carrier a succession of second pulses from said source, the phase of one of said second pulses being random and the phase of each successive second pulse being ninety degrees forwardly from its preceding pulse, means for impressing on said carrier a succession of third pulses from said source, the phase of one of said third pulses being random and the phase of each successive third pulse being ninety degrees backwardly from its preceding pulse, and means for selectively transmitting any one of said successions of first, second or third pulses.

References Cited by the Examiner

UNITED STATES PATENTS

| | | | |
|---|---|---|---|
| 2,629,010 | 2/1953 | Graham | 178.6 |
| 2,784,255 | 3/1957 | Earp | 179—15 |
| 2,977,417 | 3/1961 | Doelz | 178—66 |
| 3,022,461 | 2/1962 | Wilcox | 329—145 X |
| 3,028,487 | 4/1962 | Losee | 328—109 |

FOREIGN PATENTS

| | | |
|---|---|---|
| 828,782 | 2/1960 | Great Britain. |

DAVID G. REDINBAUGH, *Primary Examiner.*

STEPHEN W. CAPELLI, *Examiner.*